(12) United States Patent
Aoyagi (10) Patent No.: US 10,010,944 B2
(45) Date of Patent: Jul. 3, 2018

(54) TOOL POST FOR MACHINE TOOL (71) Applicants: CITIZEN WATCH CO., LTD., Nishitokyo-shi, Tokyo (JP); CITIZEN MACHINERY CO., LTD., Kitasaku-gun, Nagano (JP)

(72) Inventor: Atsushi Aoyagi, Tokyo (JP)

(73) Assignees: CITIZEN WATCH CO., LTD., Nishitokyo-Shi, Tokyo (JP); CITIZEN MACHINERY CO., LTD., Kitasaku-Gu, Nagano (JP)

( * ) Notice: Subject to any disclaimer, the term of this patent is extended or adjusted under 35 U.S.C. 154(b) by 0 days.

(21) Appl. No.: 15/562,211

(22) PCT Filed: Mar. 22, 2016

(86) PCT No.: PCT/JP2016/058895
§ 371 (c)(1),
(2) Date: Sep. 27, 2017

(87) PCT Pub. No.: WO2016/158545
PCT Pub. Date: Oct. 6, 2016

(65) Prior Publication Data
US 2018/0117681 A1    May 3, 2018

(30) Foreign Application Priority Data

Mar. 31, 2015    (JP) ................. 2015-070906

(51) Int. Cl.
*B23B 29/32*    (2006.01)
*B23Q 5/10*    (2006.01)
*B23B 29/24*    (2006.01)

(52) U.S. Cl.
CPC ............ *B23B 29/24* (2013.01); *B23B 29/323* (2013.01); *B23Q 5/10* (2013.01); *B23Q 2220/002* (2013.01); *Y10T 29/5155* (2015.01)

(58) Field of Classification Search
CPC .......... Y10T 408/37; Y10T 29/5152–29/5167; Y10T 29/519; Y10T 82/2587;
(Continued)

(56) References Cited

U.S. PATENT DOCUMENTS 5,161,290 A * 11/1992 Hashimoto .......... B23Q 16/025
29/40
6,925,694 B2 * 8/2005 Sauter .................... B23Q 39/02
29/39

(Continued)

FOREIGN PATENT DOCUMENTS

EP    331003 A2 * 9/1989
EP    1 287 931 A2    3/2003
(Continued)

OTHER PUBLICATIONS

Machine Translation of JP 60-034239 A, which JP '239 was published Feb. 1985.*

(Continued)

*Primary Examiner* — Erica E Cadugan
(74) *Attorney, Agent, or Firm* — Knobbe, Martens, Olson & Bear LLP (57) ABSTRACT

A first driving force transmission part is disposed between an attachment part turning transmission shaft and a tool attachment part. The first driving force transmission part transmits rotary driving force from a side of the attachment part turning transmission shaft to the side of the first turning driving force transmission shaft, and includes a groove, a tenon shaped protrusion, and protrusions. The groove is formed on a tip of a slide shaft of the attachment part turning transmission shaft. The tenon shaped protrusion is formed in the first turning driving force transmission shaft and detachably engages with the groove. The protrusions once releases an engaging posture by pressing the groove that is biased to the engaging posture in an disengaging state when the tool (Continued)

is in the middle of the movement to a predetermined position.

5 Claims, 6 Drawing Sheets

(58) Field of Classification Search
CPC ............ Y10T 409/309352–409/309464; Y10T 408/95; Y10T 408/97; B23Q 2220/002; B23Q 2039/004; B23Q 2716/02; B23Q 39/02; B23Q 39/025; B23Q 39/027; B23B 29/24–29/34; B23B 39/205; B23B 39/20
USPC .... 29/40, 35.5–48.5 A, 33 J; 408/35, 239 R, 408/239 A; 82/159; 409/231–233
See application file for complete search history.

(56) References Cited

U.S. PATENT DOCUMENTS

| | | | |
|---|---|---|---|
| 7,137,180 B2 * | 11/2006 | Matsumoto | B23Q 5/04 29/40 |
| 7,150,085 B2 * | 12/2006 | Ishiguro | B23Q 39/02 29/40 |
| 7,971,328 B2 * | 7/2011 | Sahm | B23Q 5/04 29/40 |
| 2003/0046799 A1 | 3/2003 | Matsumoto | |
| 2008/0060182 A1 | 3/2008 | Wawrzyniak | |
| 2009/0188093 A1 | 7/2009 | Wawrzyniak | |
| 2009/0193638 A1 | 8/2009 | Wawrzyniak | |
| 2009/0193639 A1 | 8/2009 | Wawrzyniak | |
| 2017/0014965 A1 * | 1/2017 | Baldaccini | B23B 29/34 |

FOREIGN PATENT DOCUMENTS

| | | |
|---|---|---|
| JP | 60-034239 A * | 2/1985 |
| JP | H02-0311204 A | 12/1990 |
| JP | H07-073804 B2 | 8/1995 |
| JP | H10-138015 A | 5/1998 |
| JP | 2002-052405 A | 2/2002 |
| JP | 2003-071615 A | 3/2003 |
| WO | WO 2009/060386 A2 | 5/2009 |
| WO | WO-2016/158545 A1 * | 10/2016 |

OTHER PUBLICATIONS

International Search Report mailed by Japan Patent Office dated Jun. 7, 2016 in PCT Application No. PCT/JP2016/058895.

* cited by examiner

TOOL POST FOR MACHINE TOOL

CROSS-REFERENCE TO RELATED APPLICATIONS

This application is the U.S. National Phase under 35 U.S.C. § 371 of International Application No. PCT/JP2016/058895, filed on Mar. 22, 2016, which claims priority to Japanese Patent Application No. 2015-070906, filed on Mar. 31, 2015. The entire contents of these applications are incorporated herein by reference.

TECHNICAL FIELD

This invention relates to a tool post for a machine tool.

BACKGROUND ART

Conventionally, there is a known tool post for a machine tool, the tool post transmitting rotational driving force to a tool. The tool post includes a supporting member that movably supports the tool. Between the supporting member and the tool, a driving force transmission part is disposed to transmit rotational driving force to the tool. The driving force transmission part includes an engaging member on the side of the supporting member and an engaging member on the side of the tool. Then engaging members detachably engage with the transmission part in accordance with the movement of the tool. At least one of the engaging members is disposed to be biased to an engaging posture in which both of the engaging members are capable of engaging. Between the tool side and the supporting member side, a releasing member is disposed. The releasing member releases the engaging posture by pressing the engaging members against the biasing force. The tool post is configured to transmit the rotational driving force to the tool by moving the tool to a predetermined position in which the both engaging members engage (Patent Literature 1: JP H07-73804 B, for example).

SUMMARY

However, the conventional tool post has a following problem. The at least one of the engaging members is disposed to be biased to the engaging posture. Accordingly, when the at least one engaging member is biased to the engaging posture while in a disengaging state in the middle of the moving of the tool to the predetermined position, it may not be easy to smoothly detach the engaging member when the tool is reached to the predetermined position.

An object of the preset invention is to provide a tool post for a machine tool that can smoothly detach engaging members.

To achieve the above object, a tool post for the machine tool according to the present invention includes a supporting member that movably supports a tool, a driving force transmission part that is disposed between the supporting member and the tool to transmit driving force to the tool, the driving force transmission part comprising an engaging member that is located in a side of the supporting member, and an engaging member that is located in a side of the tool, and the engaging members engaging in accordance with a movement of the tool, at least one of the engaging members provided to be biased to an engaging posture in which both of the engaging members are capable of engaging, and a releasing member that is disposed between the side of the tool and the side of the supporting member, and releases the engaging posture by pressing the engaging member against a biasing force. A driving force is transmitted to the tool via the driving force transmission part by moving the tool to a predetermined position where the both of the engaging members engage, and the releasing member is disposed to release the engaging posture by pressing the engaging member in the middle of the movement of the tool toward the predetermined position, the engaging member is biased to the engaging posture when the engaging member is in a disengaging state, and to release the pressing when the tool reaches the predetermined position to engages the both of the engaging members.

DETAILED DESCRIPTION

The present invention is described based on an embodiment illustrated in the drawings.

Figure 1:
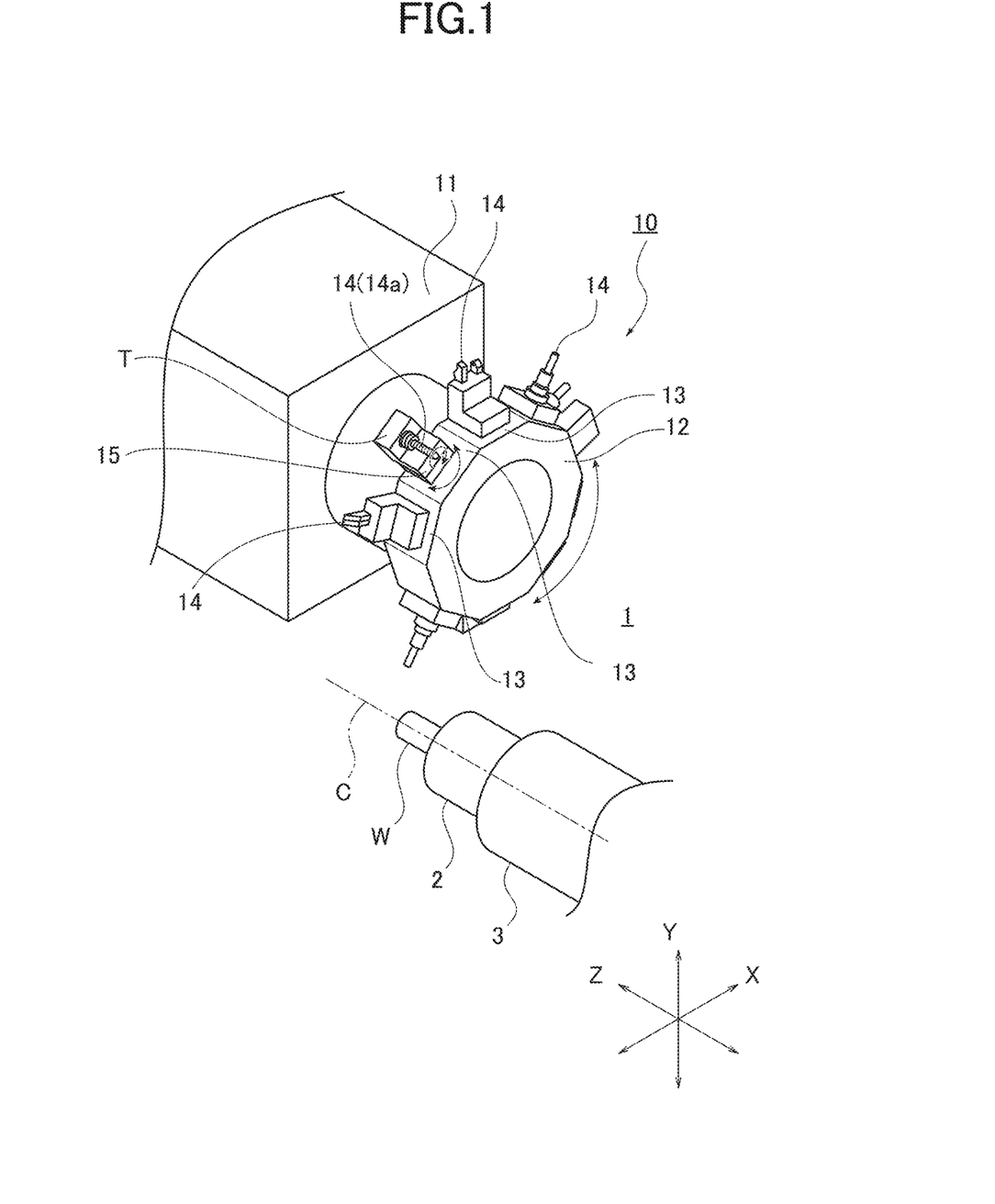
FIG. 1 is a schematic perspective view illustrating a vicinity of a main spindle of an automatic lathe that is an example of a machine tool including a tool post according to an embodiment of the present invention.
Figure 2:
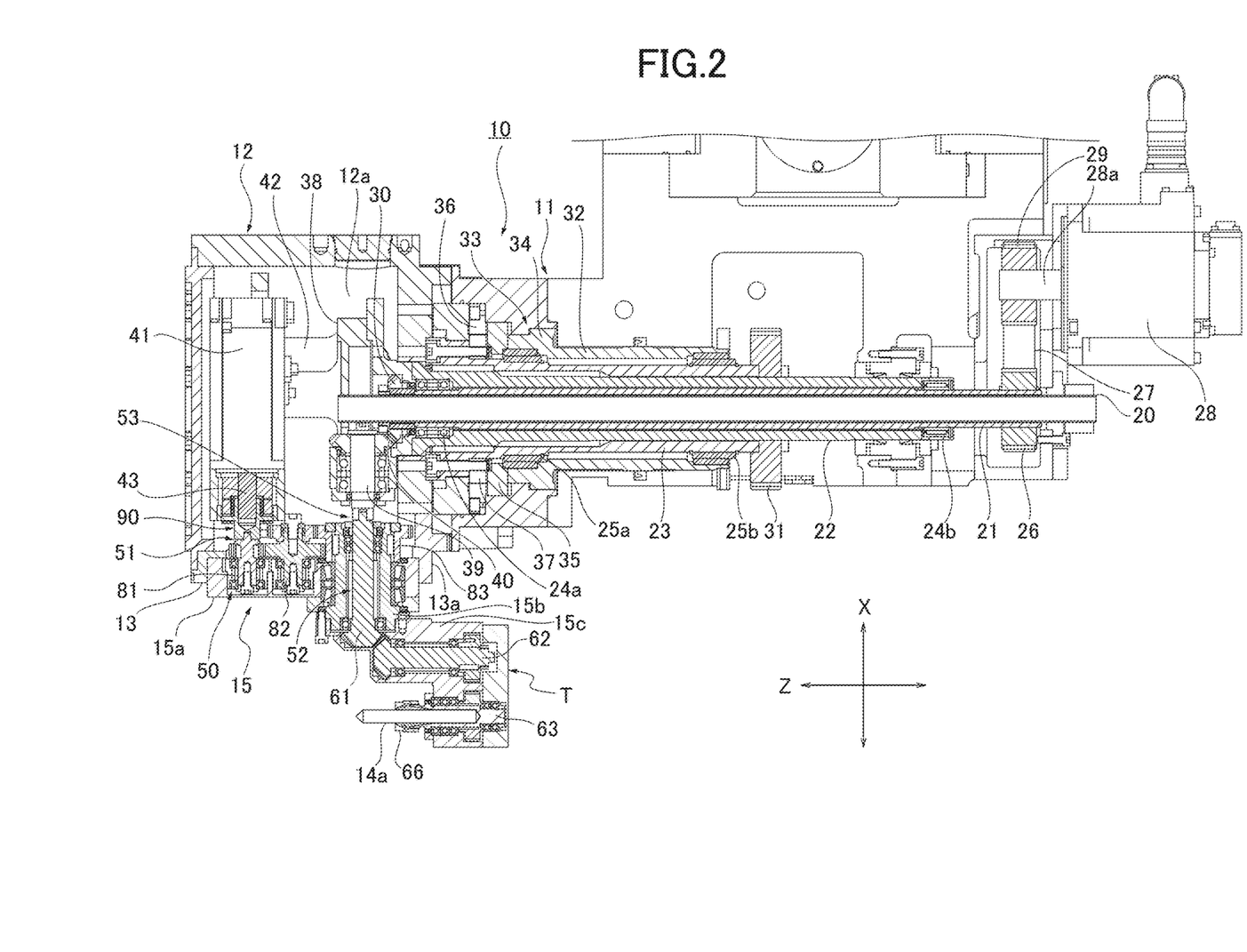
FIG. 2 is a schematic cross-sectional view along an X-axis direction, illustrating an internal configuration of the tool post according to the embodiment of the present invention.

FIG. 1 is a schematic perspective view illustrating a vicinity of a main spindle of an automatic lathe that is an example of a machine tool including a tool post according to an embodiment of the present invention. FIG. 2 is a schematic cross-sectional view illustrating an internal configuration of the tool post according to an embodiment of the present invention.

In an automatic lathe 1, a main spindle 2 is rotatably supported by a main spindle headstock 3. The main spindle 2 detachably holds a work W via a spindle chuck at the tip of the main spindle 2. In the vicinity of the main spindle 2, a tool post 10 is installed. Note that, in this embodiment, a direction along a main spindle axis C is referred to a Z-axis direction, a horizontal direction perpendicular to the Z-axis direction is referred to an X-axis direction, and a vertical direction perpendicular to both the Z-axis and X-axis directions is referred to a Y-axis direction.

The tool post 10 includes a tool post body 11, and a turret 12 having a substantially polygonal shape. The turret 12 is supported by the tool post body 11 to be turnable for indexing. The turret 12 includes a plurality of turret surfaces 13 on the circumferential surface thereof. On the turret surfaces 13, various tools 14 for machining are detachably mounted. Each of the tools 14 is turnably supported by the tool post body 11 as a supporting member via the turret 12.

Turning the turret 12 for indexing turns or moves each of the tools 14 so that a predetermined tool 14 is selectively placed at a machining position which corresponds to the work W. The tool post body 11 is controllable to move in the X-axis, Y-axis, Z-axis directions by a turret tool post moving mechanism. In accordance with the movement of the tool post body 11, it is possible to process the work W with the tool 14 selected by turning the turret 12 for indexing.

As shown in FIG. 2, a hollow fixed shaft 22 is fixed inside the tool post body 11 along the Z-axis direction. Inside the fixed shaft 22, a hollow tool rotating drive shaft 21 is inserted and rotatably supported via bearings 24 a, 24 b. A turret turning shaft 23 is turnably provided around the fixed shaft 22. Inside the tool rotating drive shaft 21, a pipe 20 is inserted. The pipe 20 is fixed on a side of the tool post body 11.

A pulley 26 is mounted on one end (a right side in FIG. 2) of the tool rotating drive shaft 21. A pulley 29 is mounted on a motor shaft 28a of a tool rotating motor 28. The pulley 26 and the pulley 29 are connected each other via a belt 27 so that the rotational driving force of the tool rotating motor 28 is transmitted to the tool rotating drive shaft 21 via the pulley 29, the belt 27, and the pulley 26. A bevel gear 30 is mounted on the other end (a left side in FIG. 2) of the tool rotating drive shaft 21.

A turret turning gear 31 is integrally mounted on the one end (the right side in FIG. 2) of the turret turning shaft 23. The driving force is transmitted to the turret turning gear 31 from a turret turning motor. The turret 12 is integrally fixed to the other end (the left side in FIG. 2) of the turret turning shaft 23. The turret 12 is turnably supported by the tool post body 11 via the turret turning shaft 23.

A slide shaft 32 is slidably disposed around the turret turning shaft 23 via bearings 25a, 25b to be slidable along the Z-axis direction. The bearings 25a, 25b allow the slide shaft 32 to slide along the Z-axis direction. One end of the slide shaft 32 forms a piston 34. The piston 34 is inserted into a cylinder chamber 33 formed in the tool post body 11. A coupling element 35 is integrally fixed to the one end of the slide shaft 32. The coupling element 35 constitutes a three-part coupling mechanism. Opposing to the coupling element 35, coupling elements 36, 37 are integrally fixed in a side of the slide shaft 32 and a side of the tool post body 11, respectively. The coupling elements 35, 36, 37 constitute the three-part coupling mechanism.

By operating the piston 34 to move the slide shaft 32 toward the side (the left side of FIG. 2) of the turret 12, the coupling element 35 and the coupling elements 36, 37 engage or mesh with each other. The coupling element 37 on the side of the turret turning shaft 23 engages with the coupling element 36 on the side of the tool post body 11 via the coupling element 35 so that the turning of the turret turning shaft 23 is suppressed. By slidingly driving the slide shaft 32 to release the engagement between the coupling element 35 and the coupling elements 36, 37, the coupling element 36 and the coupling element 37 are separated, and accordingly, the turret turning shaft 23 is allowed to turn around.

The turning of the turret 12 for indexing is performed by allowing the turret turning shaft 23 to turn around, by turning the turret turning shaft 23 to turn the turret 12, and by suppressing the turning of the turret turning shaft 23 at a predetermined turn angle position. The turning of the turret 12 for indexing selects a required turret surface 13 to be fixed and accordingly a required tool 14 is selected.

A supporting portion 38 is located inside a hollow portion 12a of the turret 12 and integrally fixed to a tip of the fixed shaft 22. The supporting portion 38 is integrally fixed to the tool post body 11 via the fixed shaft 22. The supporting portion 38 rotatably supports a tool rotation transmission shaft 39. A bevel gear 40 is mounted on one end of the tool rotation transmission shaft 39. The bevel gear 30 meshes with the bevel gear 40 so that the driving force is transmitted from the tool rotating drive shaft 21 to the tool rotation transmission shaft 39.

A tool turning motor 41 is fixed to the supporting portion 38 via a bracket 42 to be located inside the hollow portion 12a. Note that the electrical wiring and the like connected to the tool turning motor 41 are drawn to the side of the tool post 10 through the hollow pipe 20 and connected to a control device.

Figure 3:
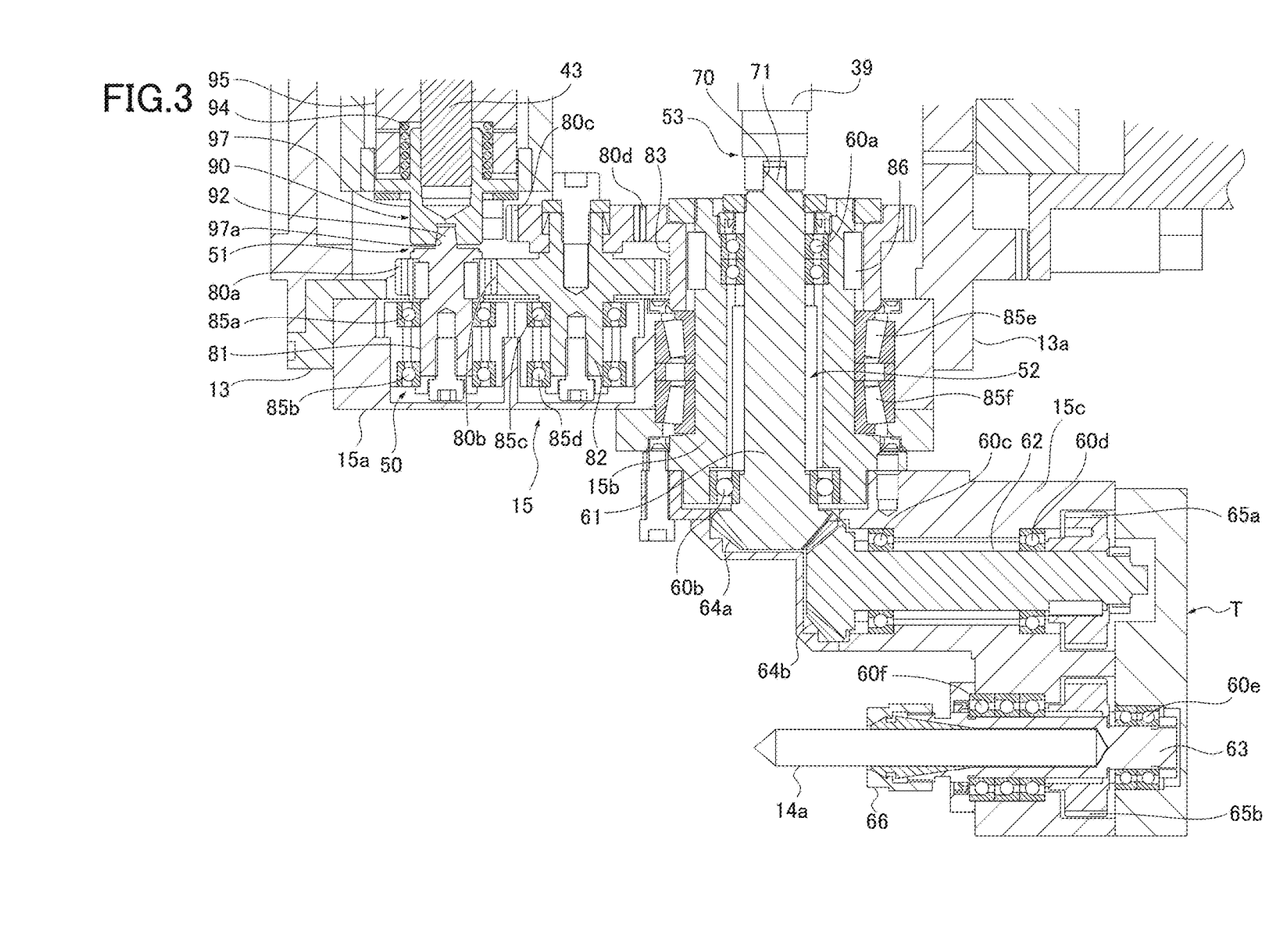
FIG. 3 is a schematic cross-sectional view illustrating a vicinity of a tool attachment part to which a rotary tool is attached.

As shown in FIGS. 2, 3, on the side of the turret surface 13, a hollow tubular fixing portion 13a is formed. A rotary tool device T is detachably fixed to the tubular fixing portion 13a via a tool attachment part 15. The rotary tool device T includes a rotary tool 14a such as a drill, an end mill, or the like as the tool 14. The tool attachment part 15 includes an outer holder 15a and an inner holder 15b. The outer holder 15a is detachably fixed to an inner surface of the fixing portion 13a, and accordingly the tool attachment part 15 is attached to the turret surface 13.

Inside the tool attachment part 15, a turning driving force transmission mechanism 50 and a rotary driving force transmission mechanism 52 are provided. The turning driving force transmission mechanism 50 transmits the turning driving force to the inner holder 15b. The rotary driving force transmission mechanism 52 transmits the rotary driving force to the rotary tool 14a. An attachment part turning transmission shaft 90 is connected to a tip of a motor shaft 43 of the tool turning motor 41. Between the attachment part turning transmission shaft 90 and the turning driving force transmission mechanism 50, a first driving force transmission part 51 is disposed. The first driving force transmission part 51 is configured to transmit the rotary driving force of the tool turning motor 41 to the side of the turning driving force transmission mechanism 50 when the rotary tool 14a is selected by turning the turret 12 for indexing, and a tenon shaped protrusion 92 engages with a groove 97a (described below). The attachment part turning transmission shaft 90 is arranged substantially parallel to the tool rotation transmission shaft 39.

Between the other end (a side opposed to the bevel gear 40) of the tool rotation transmission shaft 39 and the rotary driving force transmission mechanism 52, a second driving force transmission part 53 is disposed. The second driving force transmission part 53 is configured to transmit the rotary driving force of the tool rotating motor 28 to the side of the rotary driving force transmission mechanism 52 when the rotary tool 14a is selected by turning the turret 12 for indexing, and a tenon shaped protrusion 71 engages with a groove 70 (described below).

The rotary driving force transmission mechanism 52 includes a rotary driving force transmission shaft 61. The rotary driving force transmission shaft 61 is inserted to the inner holder 15b and rotatably supported by the inner holder 15b via bearings 60a, 60b. The inner holder 15b is rotatably supported by the outer holder 15a via bearings 85e, 85f. The rotary driving force transmission shaft 61 includes a bevel gear 64a at an end thereof.

The second driving force transmission part 53 includes the groove 70 and the tenon shaped protrusion 71. The groove 70 is formed at the tip of the tool rotation transmission shaft 39. The tenon shaped protrusion 71 is formed at the tip of the rotary driving force transmission shaft 61. The tenon shaped protrusion 71 is configured such that the tenon shaped protrusion 71 detachably engages with (is fitted into) the groove 70 when the turret 12 is turned to select the rotary tool 14a.

When the tenon shaped protrusion 71 of the second driving force transmission part 53 engages with the groove 70, the rotary driving force transmitted to the tool rotation transmission shaft 39 can be then transmitted to the rotary driving force transmission shaft 61.

The turning driving force transmission mechanism 50 includes a first turning driving force transmission shaft 81, a second turning driving force transmission shaft 82, a gear 80c, and a tubular shaft 83. The first turning driving force transmission shaft 81 includes a gear 80a attached thereto. The second turning driving force transmission shaft 82 includes a gear 80b integrally attached thereto. The gear 80c is attached to the second turning driving force transmission shaft 82. The tubular shaft 83 includes a gear 80d formed therewith. The gear 80a engages with the gear 80b, and the gear 80c engages with the gear 80d.

The first turning driving force transmission shaft 81 is rotatably supported by the outer holder 15a via bearings 85a, 85b. The second turning driving force transmission shaft 82 is rotatably supported by the outer holder 15a via bearings 85c, 85d. The tubular shaft 83 is integrally fixed to the inner holder 15b via a connecting member 86. The bearings 60a, 60b are disposed between the outer surface of the rotary driving force transmission shaft 61 and the inner surface of the inner holder 15b. A tool device body 15c of the rotary tool device T is detachably and integrally fixed to the tip side of the inner holder 15b via bolts or the like.

The rotary tool device T includes a first rotary driving force transmission shaft 62 and a second rotary driving force transmission shaft 63. The first rotary driving force transmission shaft 62 is rotatably supported by the tool device body 15c via bearings 60c, 60d. The second rotary driving force transmission shaft 63 is rotatably supported by the tool device body 15c via bearings 60e, 60f. The rotary tool 14a is detachably attached to the second rotary driving force transmission shaft 63 via a chuck mechanism 66.

The first rotary driving force transmission shaft 62 and the second rotary driving force transmission shaft 63 coordinate with each other via gears 65a, 65b which mesh with each other via other gears or the like. The first rotary driving force transmission shaft 62 includes a bevel gear 64b provided at an end thereof. When the tool device body 15c is fixed to the inner holder 15b, the bevel gear 64a and the bevel gear 64b mesh with each other and accordingly the rotary driving force transmission shaft 61 and the first rotary driving force transmission shaft 62 coordinate with each other. When the tenon shaped protrusion 71 of the second driving force transmission part 53 engages with the groove 70 to transmit the rotary driving force from the tool rotation transmission shaft 39 to the rotary driving force transmission shaft 61, the rotary driving force is transmitted from the rotary driving force transmission shaft 61 to the rotary tool 14a through the bevel gears 64a, 64b, the first rotary driving force transmission shaft 62, the gears 65a, 65b, and the second rotary driving force transmission shaft 63.

Figure 4:
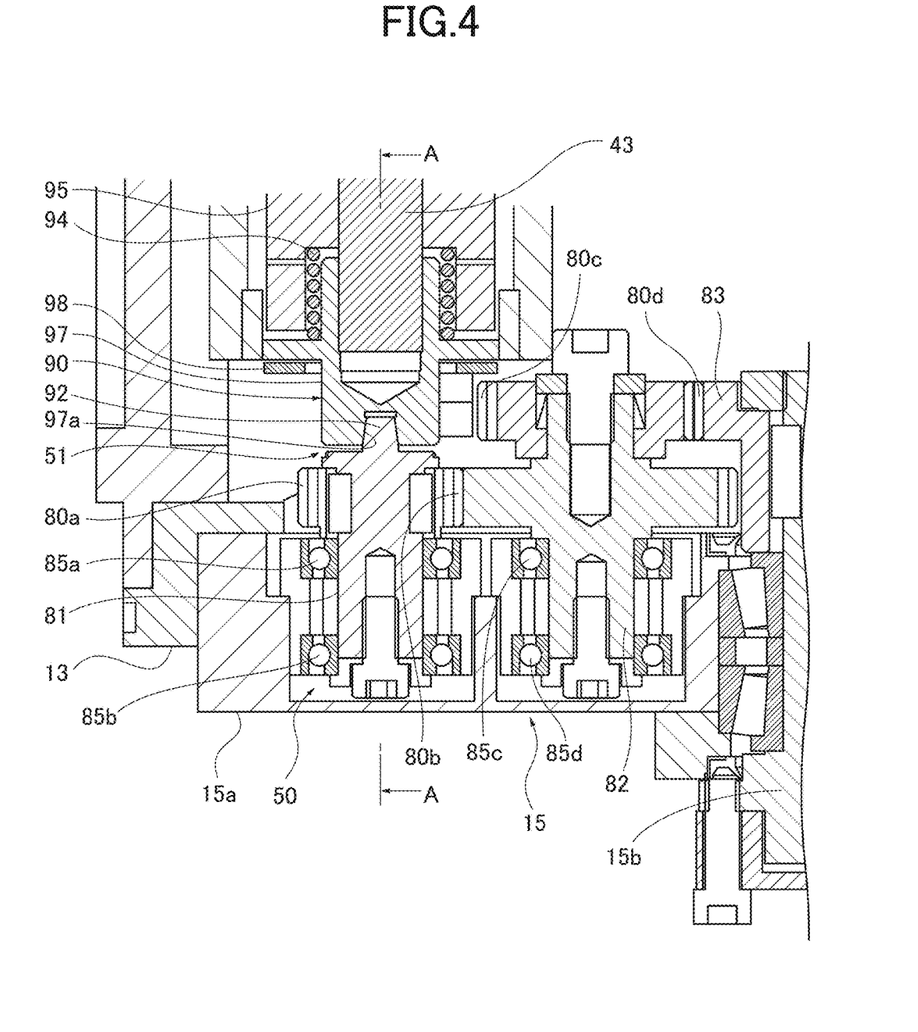
FIG. 4 is a schematic cross-sectional view illustrating a vicinity of a first driving force transmission part.

The first driving force transmission part 51 includes a groove 97a and a tenon shaped protrusion 92. The groove 97a is an engaging member formed at the tip of the attachment part turning transmission shaft 90. The attachment part turning transmission shaft 90 is disposed on the side of the tool post body 11 of the tool post 10. The tenon shaped protrusion 92 is an engaging member formed at the tip of the first turning driving force transmission shaft 81 of the turning driving force transmission mechanism 50 within the tool attachment part 15. The tool attachment part 15 is attached to the turret 12 (the turret surface 13) on the side of the rotary tool 14a thereof. The tenon shaped protrusion 92 is configured to detachably engage with (is fit into) the groove 97a when the turret 12 turns and the rotary tool 14a is selected in accordance with the turning of the turret 12.

When the tenon shaped protrusion 92 engages with the groove 97a, the turning driving force transmitted to the attachment part turning transmission shaft 90 from the motor shaft 43 is transmitted to the first turning driving force transmission shaft 81 via the first driving force transmission part 51, and then transmitted to the inner holder 15b via the first turning driving force transmission shaft 81, the gears 80a, 80b, the second turning driving force transmission shaft 82, the gears 80c, 80d, and the tubular shaft 83. The above turning driving force rotates the inner holder 15b. The turning of the tool attachment part 15, which rotates the inner holder 15b, turns the rotary tool device T together with the inner holder 15b and accordingly turns the rotary tool 14a together with the rotary tool device T.

The tool post 10 of this embodiment is configured as described above. The rotary tool 14a is supported by the tool attachment part 15 via the rotary tool device T. When the rotary tool 14a is turned (moved) to an indexing position and selected, the tenon shaped protrusion 71 of the second driving force transmission part 53 engages with the groove 70. Then, the rotary driving force generated by the rotary drive of the tool rotating motor 28 is transmitted from the tool rotation transmission shaft 39 and the like to the rotary tool 14a via the rotary driving force transmission mechanism 52. The rotary tool 14a is rotatably driven by the transmitted rotary driving force to perform a predetermined cutting process or the like to the work W.

At this time, the tenon shaped protrusion 92 of the first driving force transmission part 51 engages with the groove 97a. Accordingly, by rotating the tool turning motor 41, the rotary tool 14a is turned on the turret surface 13 together with the rotary tool device T via the turning driving force transmission mechanism 50 so that the rotary tool 14a can perform process as inclined at a predetermined angle relative to the outer circumference and/or the end surface of the work W.

Next, the first driving force transmission part 51 is described in detail.

Figure 5:
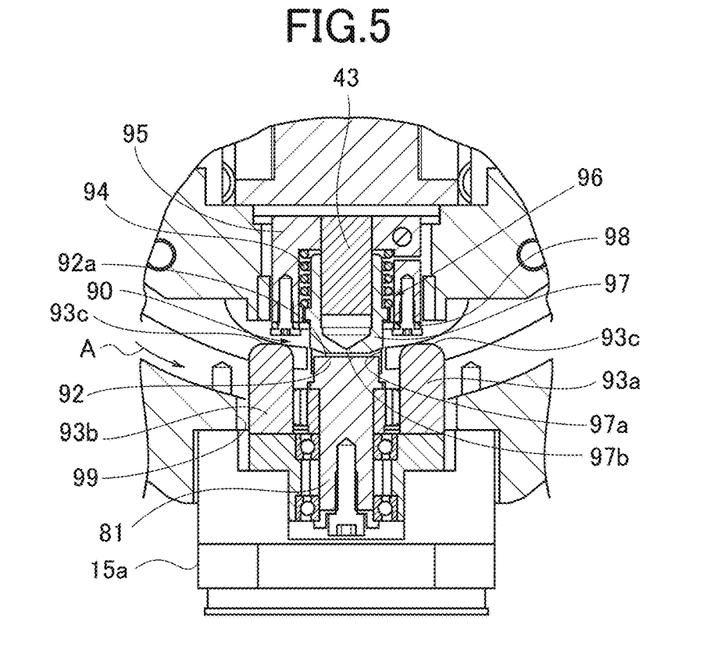
FIG. 5 is a cross-sectional view along a line A-A of FIG. 4.

As shown in FIGS. 3, 4, 5, the attachment part turning transmission shaft 90 includes a tubular member 95 and a slide shaft 97. The tubular member 95 is fixed to the outer circumference of the motor shaft 43. The slide shaft 97 engages with the tubular member 95 via a spline coupling part 96. The tubular member 95 is fixed to the motor shaft 43 by screw fastening, press fitting or the like. With the spline coupling part 96, the slide shaft 97 is provided integrally with the tubular member 95 in a rotational direction and is slidable in an axial direction with respective to the tubular member 95. The slide shaft 97 is slidably disposed around the motor shaft 43. The groove 97a is provided at the tip of the slide shaft 97.

Between the slide shaft 97 and the tubular member 95, a spring member 94 in the form of a coil is disposed. The spring member 94 biases the slide shaft 97 to the side of the first turning driving force transmission shaft 81 (the tenon shaped protrusion 92). At the tip of the tubular member 95, a restricting member 98 is disposed. The restricting member 98 prevents the disengagement of the slide shaft 97 from the tubular member 95 and restricts the moving range of the slide shaft 97 toward an axial tip side direction of the slide shaft 97.

Note that in a state of the first driving force transmission part 51 shown in FIGS. 2 to 5, the rotary tool 14*a* is selected by turning the turret 12, and the tenon shaped protrusion 92 engages with the groove 97*a*. FIG. 5 is a cross-sectional view along a line A-A of FIG. 4, illustrating a surface along a turret turning direction (a direction shown with an arrow A).

The groove 97*a* has a tapered cross-section defined with inclined surfaces where a gap between opposed inner wall surfaces becomes narrower toward a far side (the side of the motor shaft 43). The tenon shaped protrusion 92 has a tapered shape such that its thickness decreases toward the tip side in accordance with the tapered shape of the groove 97*a*. Accordingly, when the tenon shaped protrusion 92 engages with the groove 97*a*, the tenon shaped protrusion 92 comes into contact with the groove 97*a* in a close fit manner without any gap there between.

Two protrusions 93*a*, 93*b* are disposed on both sides of the tenon shaped protrusion 92 so as to protrude from the tool attachment part 15 (the outer holder 15*a*). As shown in FIG. 5, the two protrusions 93*a*, 93*b* are positioned in the vicinity of the both sides of the tenon shaped protrusion 92 along the turning direction (the direction shown with the arrow A) of the turret 12. The tip surfaces 93*c* of the respective protrusions 93*a*, 93*b* protrude toward a side of the attachment part turning transmission shaft 90 further than the tip surface 92*a* of the tenon shaped protrusion 92. The protrusions 93*a*, 93*b* are formed to be inserted into a groove 99 with a relatively large gap.

The groove 97*a* includes a bottom surface 97*b*. The edges of the bottom surface 97*b* in the sides of the turret turning direction (the direction shown with the arrow A) are chamfered to have inclined surfaces. The edges of the tip surfaces 93*c* of the respective protrusions 93*a*, 93*b* in the sides of the turret turning direction (the direction shown with the arrow A) are formed to have curved shapes (round shapes).

Next, the operation of the first driving force transmission part 51 as configured above is described.

Figure 6:
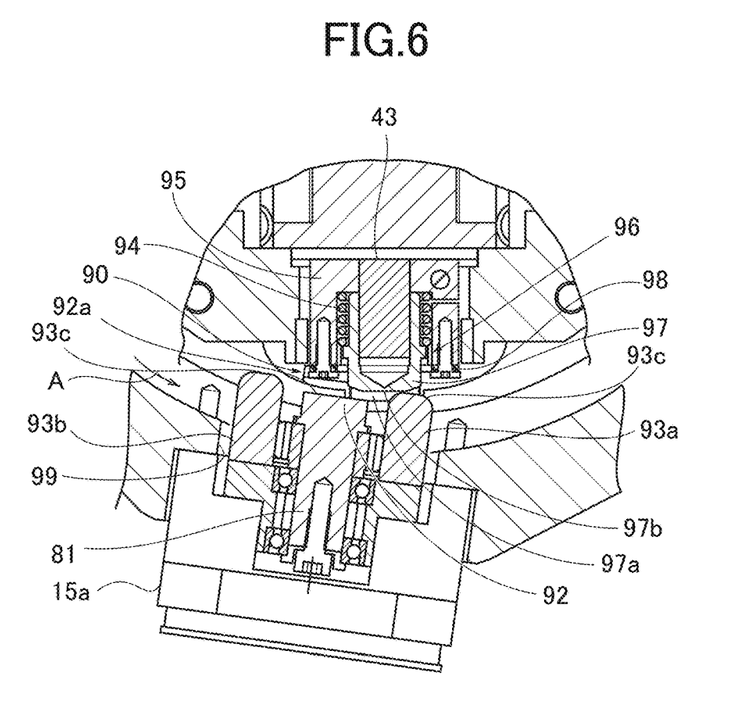
FIG. 6 is a schematic cross-sectional view illustrating an operating state of the first driving force transmission part when a turret turns to select a rotary tool.

As shown in FIG. 6, when the turret 12 turns in the direction shown with the arrow A to select the rotary tool 14*a*, in the middle of the turning of the rotary tool 14*a*, the protrusion 93*a* (which is located forward in the turret turning direction (the direction shown with the arrow A)) is inserted into the groove 97*a* prior to the tenon shaped protrusion 92. Then, the tip surface 93*c* slidingly contacts the bottom surface 97*b* of the groove 97*a* and presses the slide shaft 97 against the biasing force of the spring member 94 to slide the slide shaft 97 in an axial direction of the motor shaft 43.

Figure 7:
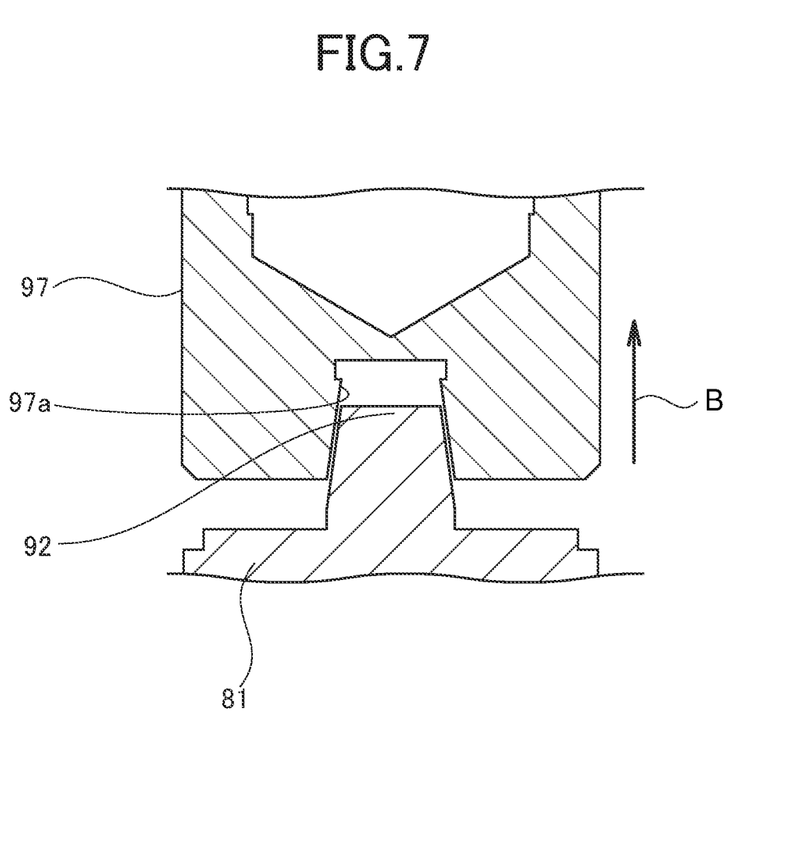
FIG. 7 is a schematic cross-sectional view illustrating a state in which an engaging posture between a tenon shaped protrusion and a groove is once released.

As shown in FIG. 7, with the movement of the slide shaft 97 in the axial direction, the groove 97*a* moves in the axial direction (a direction shown with an arrow B) of the motor shaft 43. Accordingly, the groove 97*a* is positioned with respect to the tenon shaped protrusion 92 such that the tip portion of the tenon shaped protrusion 92 which has a relatively small width faces the tip portion of the groove 97*a* which has a relatively large width.

From the above state, when the turret 12 further turns in the direction shown with the arrow A as shown in FIGS. 4, 5, the protrusion 93*a* (the tip surface 93*c*) keeps slidingly contacting the bottom surface 97*b* of the groove 97*a*, and the tenon shaped protrusion 92 is easily inserted into the groove 97*a* from a circumferential direction by relatively large difference in the fitting dimensions between the tenon shaped protrusion 92 and the groove 97*a*. At the timing when the rotary tool 14*a* turns to the indexing position and the tenon shaped protrusion 92 reaches a predetermined position in which the tenon shaped protrusion 92 engages with the groove 97*a*, the protrusion 93*a* is separate from the bottom surface of the groove 97*a*, and the pressed state of the slide shaft 97 by the protrusion 93*a* is released. Then, the slide shaft 97 moves toward the tenon shaped protrusion 92 with the biasing force of the spring member 94, and the groove 97*a* is biased to an engaging posture in which the tenon shaped protrusion 92 engages with the groove 97*a*. As a result, the tenon shaped protrusion 92 engages with the groove 97*a*.

As described above, when the turret 12 turns in the direction shown with the arrow A to select the rotary tool 14*a*, the turret 12 turns while the groove 97*a* disengages with the tenon shaped protrusion 92 and is biased by the spring member 94 to the engaging posture. In the middle of the movement of the rotary tool 14*a* to the predetermined indexing position in which the tenon shaped protrusion 92 engages with the groove 97*a*, the protrusion 93*a* as a releasing member slidingly contacts the bottom surface 97*b* of the groove 97*a* to press the slide shaft 97 against the biasing force by the spring member 94. Accordingly, the engaging posture of the groove 97*a* is released, and the relatively large difference in the dimensions between the tenon shaped protrusion 92 and the groove 97*a* is once provided as a gap. As a result, the tenon shaped protrusion 92 is easily inserted into the groove 97*a* from the circumferential direction.

At the timing when the rotary tool 14*a* reaches the indexing position, and the tenon shaped protrusion 92 reaches the predetermined position in which the tenon shaped protrusion 92 engages with the groove 97*a*, the pressed state is released by separating the protrusion 93*a* from the bottom surface 97*b* of the groove 97*a*. Accordingly, the spring member 94 biases the groove 97*a* with the biasing force to the engaging posture, and the tenon shaped protrusion 92 can smoothly engages with the groove 97*a*.

Since the tenon shaped protrusion 92 and the groove 97*a* are formed to have a tapered shape respectively, the tenon shaped protrusion 92 and the groove 97*a* engage with each other in a close contact manner. Accordingly, when the turning driving force of the tool turning motor 41 is transmitted to the side of the first turning driving force transmission shaft 81 via the first driving force transmission part 51, it is possible to reduce the occurrence of rattle and wear between the tenon shaped protrusion 92 and the groove 97*a*.

In addition, when the turret 12 further turns in the direction shown with the arrow A (a counterclockwise direction) from a state where the tenon shaped protrusion 92 engages with the groove 97*a* to select other tools, the tip surface 93*c* of the other protrusion 93*b* slidingly contact the bottom surface 97*b* of the groove 97*a* to press the slide shaft 97 against the biasing force by the spring member 94. Thereby, a gap is once provided between the tenon shaped protrusion 92 and the groove 97*a*. Accordingly, the engaging state between the tenon shaped protrusion 92 and the groove 97*a* can be smoothly released. When the tenon shaped protrusion 92 is released from the engagement with the groove 97*a* and the protrusion 93*b* is released from the groove 97*a*, the spring member 94 biases the slide shaft 97. As a result, the groove 97*a* is biased to the engaging posture while disengaging with the tenon shaped protrusion 92.

When the turret 12 turns in a direction (a clockwise direction) opposing to the direction shown with the arrow A to select the rotary tool 14*a*, the protrusion 93*b* as a releasing member presses the slide shaft 97 against the biasing force of the spring member 94 to release the engaging posture of the groove 97a. Accordingly, the tenon shaped protrusion 92 can be inserted into the groove 97a from the circumferential direction.

In this embodiment, the first driving force transmission part 51 is applied to the present invention, and the turning driving force as the driving force is transmitted to the side of the rotary tool 14a. However, the present invention may be applied to the second driving force transmission part 53 which is detachable to the side of the rotary driving force transmission mechanism 52. The present invention may also be applied to an embodiment where the rotary driving force as the driving force is transmitted to the side of the rotary tool 14a.

REFERENCE SIGNS LIST

1 Automatic Lathe (Machine Tool), 2 Main Spindle, 3 Main Spindle Headstock, 10 Tool Post, 11 Tool Post Body, 12 Turret, 13 Turret Surface, 14 Tools, 14a Rotary Tool, 15 Tool Attachment Part, 21 Tool Rotating Drive Shaft, 28 Tool Rotating Motor, 23 Turret Turing Shaft, 39 Tool Rotation Transmission Shaft, 41 Tool Turing Motor, 50 Turning Driving Force Transmission Mechanism, 51 First Driving Force Transmission Part, 52 Rotary Force Transmission Mechanism, 53 Second Driving Force Transmission Part, 81 First Turing Driving Force Transmission Shaft, 90 Attachment Part Turning Transmission Shaft, 92 Tenon Shaped Protrusion, 93a, 93b Protrusions, 94 Spring Member, 95 Tubular Member, 96 Spline Coupling Part, 97 Slide Shaft, 97a Groove

What is claimed is:

1. A tool post for a machine tool, the tool post comprising:
a supporting member that movably supports a tool;
a driving force transmission part that is disposed between the supporting member and the tool to transmit driving force to the tool, the driving force transmission part comprising a first engaging member that is located at a side of the supporting member, and a second engaging member that is located at a side of the tool, and the engaging members engaging in accordance with a movement of the tool, the first engaging member provided to be biased via a biasing force to an engaging posture in which both of the engaging members are capable of engaging; and
a releasing member that is disposed between the side of the tool and the side of the supporting member, and that releases the first engaging member from the engaging posture by pressing the first engaging member against the biasing force,
wherein a driving force is transmitted to the tool via the driving force transmission part by moving the tool to a predetermined position where the both of the engaging members engage, and
wherein the releasing member is disposed to release the first engaging member from the engaging posture by pressing the first engaging member against the biasing force during the movement of the tool toward the predetermined position, so that the first and second engaging members are disengaged, and wherein the releasing member is disposed to release the pressing when the tool reaches the predetermined position so that both of the engaging members engage.

2. The tool post for the machine tool according to claim 1, wherein the engaging members are, respectively, a concave portion and a convex portion that engage with each other.

3. The tool post for the machine tool according to claim 2, wherein the concave portion is a tapered groove, and the convex portion is a tapered tenon that corresponds to a tapered shape of the concave portion.

4. The tool post for the machine tool according to claim 1, wherein the releasing member protrudes relative to the second engaging member.

5. The tool post for the machine tool according to claim 1, further comprising a turret to which the tool is installed,
wherein the tool is turnably supported relative to the supporting member by the turret being turnably supported by the supporting member, and
wherein the releasing member is disposed on a side of the turret.

* * * * *